July 21, 1925.

W. F. ENGELMANN 1,546,636

PROCESS OF PLASTICALLY REPRODUCING OBJECTS,
ESPECIALLY HUMAN HEADS AND FACES

Filed Dec. 15, 1921   2 Sheets-Sheet 1

WITNESSES:
Roy James Tracey
Claude Nathan Mangan

INVENTOR:
William Fred Engelmann

July 21, 1925.

W. F. ENGELMANN

PROCESS OF PLASTICALLY REPRODUCING OBJECTS, ESPECIALLY HUMAN HEADS AND FACES

Filed Dec. 15, 1921

WITNESSES:
Roy James Tracey
Claude Nathan Mangan

INVENTOR:
William Fred Engelmann

Patented July 21, 1925.

1,546,636

UNITED STATES PATENT OFFICE.

WILLIAM FRED ENGELMANN, OF CHICAGO, ILLINOIS.

PROCESS OF PLASTICALLY REPRODUCING OBJECTS, ESPECIALLY HUMAN HEADS AND FACES.

Application filed December 15, 1921. Serial No. 522,660.

*To all whom it may concern:*

Be it known that I, WILLIAM FRED ENGELMANN, a citizen of the United States, residing in Chicago, in the county of Cook and State of Illinois, have invented new and useful Improvements in Processes of Plastically Reproducing Objects, Especially Human Heads and Faces, of which the following is a specification.

The invention relates to processes of plastically reproducing objects, particularly parts of the human body, and has for its object the provision of means which make it possible to produce accurate plastic reproductions of objects by simple machine operations.

The invention, consists in recording the form of the object by photographing a series of contour lines of the object, and in using the photographs of these contour lines to direct the movements to be given the tool that works out a series of contour lines of the copy or of a mold from which the copy is to be made.

Two different methods which use the principles of the invention are described in the specification. The first method is referred to as method "A," the second one as method "B". Both methods differ in regards to the way the form of the object is recorded, and in the way the copy is worked out from a material block.

Various apparatus can be employed to put the principles of the invention into practise. The apparatus illustrated in the accompanying drawings are selected with the purpose in view of showing rather the principles of the invention instead of the design of the apparatus.

Referring to the accompanying drawings.

Method A.

Figure 1:
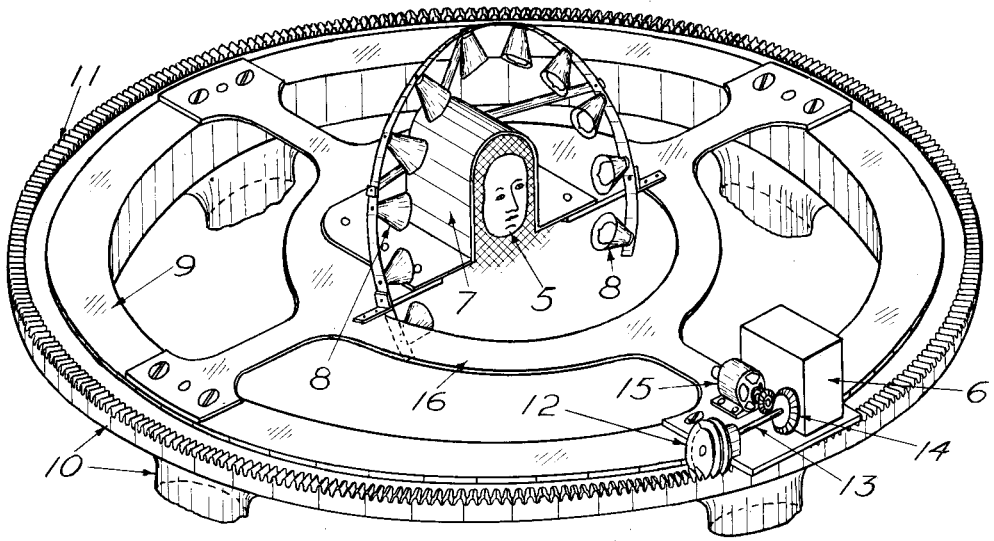
Figure 1 is a perspective view of an apparatus for recording the form of the object in accordance with method A.

Referring to Figure 1, numeral 5 represents the object of which the form is to be recorded; 6 is a moving picture camera directed towards the object; 7, a black cover open at the bottom and at one end; 8, sources of light placed outside the cover and around the object in a plane which is perpendicular in every direction to a line connecting object with camera, and which falls together with a plane laid through the edge of the cover. Numeral 9 represents a ring which is rotatably mounted in 10, a stand. This stand is provided with 11, teeth into which engages 12, a worm that is connected through 13, a shaft, and 14, a pair of bevel gears to 15, a motor. Fastened to the rotating ring is 16, a carrier, which holds camera, cover, and lights.

When recording the form of the object, the object is placed under the cover so that a small portion of the object is outside the cover and exposed to the full light, while the other larger portion of the object is inside the cover and kept in darkness.

The camera is used to take a series of pictures of the portion of the object which is outside the cover, and the light to furnish the necessary illumination for the photographic exposures. The motor is needed for two purposes: to actuate through the bevel gears the inside mechanism of the camera, and to impart through the bevel gears, shaft, and worm revolving motion to the ring holding camera, cover, and lights.

The dividing line between the illuminated portion and the dark portion of the object is by reason of the great contrast between these portions clearly visible. It indicates the contour of the object at a plane which falls together with a plane laid through the edge of the cover. The recording of the form of the object consists in photographing the contour of the object at a series of planes. During the photographic exposure the illuminated portion of the object readily affects the sensitive film in the camera, while the dark portion of the object and the black cover leave the film unaffected. The developed and fixed film will, therefore, show a sharply outlined dark field in an otherwise transparent field. This dark field represents the illuminated portion of the object, and the transparent field the dark portion of the object and the black cover. The dark field on the film is a reduced image of the illuminated portion of the object;

its outline indicates the contour of the object at the plane that falls together with the plane laid through the edge of the cover.

The continuous rotation of the ring holding the carrier moves the camera between two photographic exposures a small angle around the object, thereby causing the camera to face the object for each photographic exposure from a different direction; it also moves the cover with lights a small angle around the object causing the plane laid through the cover edge to strike the object for each photographic exposure from a different direction. As a result the contrast line will steadily change its position on the object, and the camera will photograph with each exposure a new contrast line. As these contrast lines indicate contour lines of the object at various planes, each photographic exposure records a contour line of the object at a different plane. All contrast lines are different from each other. The difference of any of them in relation to its preceding or following one, however, is very small, due to the small angular movement made by the camera between two photographic exposures. A complete revolution of the camera around the stationary object gives a series of photographs of contour lines of the object at a number of planes, which together furnish an accurate record of the form of the object.

The accuracy of the form record depends upon the number of exposures made by the camera in one revolution. By changing the gearing of the apparatus, any desired accuracy can be obtained.

If during the form recording the contrast line did not reach into every portion of the object and, consequently, left some small portions unrecorded, a small number of additional pictures of these portions have to be made by placing object or cover so that the contrast line will reach into the unrecorded portions of the object while the photographic exposures are made. As a rule, however, additional pictures are not necessary if the object is placed under the cover so that the contrast line strikes the object as advantageously as possible.

After the exposed film is developed and fixed, etc., the form recording of the object according to method A is finished.

Figure 2:
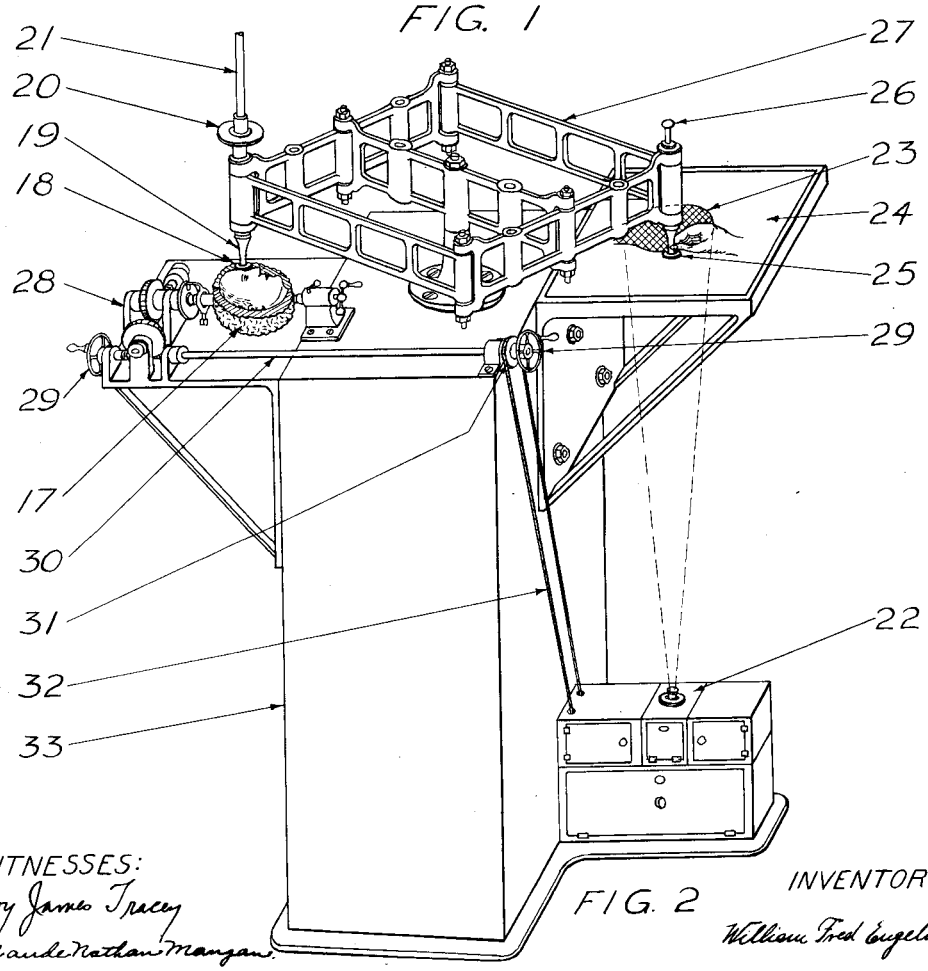
Figure 2 is a perspective view of an apparatus for working out the copy from a material block in accordance with method A.

Referring to Figure 2, which illustrates an apparatus for working out the copy from a material block in accordance with method A, numeral 17 represents the material block from which the copy is to be made; 18 is a shank milling cutter for milling away the excessive material from the material block; 19, a chuck for holding the various cutters used; 20, a wheel for fastening the cutters in the chuck and cutter spindle; and 21, a flexible shaft connected to a motor for driving the cutter spindle, chuck, and cutter. Numeral 22 represents an optical projector with light and means for holding and moving the finished film; 23 is an enlarged film image; and 24, a ground glass or other suitable screen upon which the film image is thrown by the projector. Numeral 25 represents a tracer disk; 26, means for fastening various tracer disks in the tracer disk spindle; and 27, a pantograph lever arrangement for transferring the movements given to the tracer disk to the cutter in either the same or a different size. Numeral 28 is a rotating and arresting device for rotating the material block and holding it in various positions, consisting of two worms with two worm wheels, a pair of dead centers with spindle and tail stock, face plate, and dog driver. Numeral 29 represents two hand wheels, which together with 30, a shaft, 31, a sprocket, and 32, a chain are used to change the position of the material block, and to move the film for bringing the various film images before the objective of the projector. Numeral 33 represents the stand of the apparatus.

The working out of the copy is a simple milling operation in which the copy is milled out plane by plane, and in which shank milling cutters are used for removing the excessive material from the material block. While the cutting depth for the cutter is obtained by a turn of a hand wheel, the lateral movements to be given to the cutter for working out these planes are indicated on the various film images comprising the form record. To use these images for the mentioned purpose, they are enlarged and thrown upon a screen by a projector. To each plane in which the copy is worked out belongs a special film image.

The work of milling out the copy consists in moving the tracer disk about the illuminated field of the screen without letting it enter the dark field of the screen, which represents the image of the object. The pantograph lever arrangement connecting tracer disk with cutter transfers all movements given to the tracer disk to the rotating cutter, which removes from the material block located underneath the cutter all material coming in its path. The size of the movements of the tracer disk in relation to the size of the movements of the cutter is governed by the adjustment of the pantograph lever arrangement. By moving the tracer disk about the illuminated field of the screen so that the periphery of the tracer disk always touches the outline of the dark field, the rotating cutter will leave a portion of the material unremoved which has the same contour as the outline of the enlarged image on the screen. This unremoved portion must, consequently, have the same contour as the object, as the outline of the image represents the contour of the object.

The rotating and arresting device of the material block is so connected through gearing with the inside mechanism of the projector, that first, during one complete revolution of the material block all pictures that were taken in one complete revolution of the camera around the object are brought before the objective of the projector, and that second, one turn of the hand wheel brings a new image before the objective and at the same time moves the material block the same angle that the camera was moved around the object between two photographic exposures.

After one plane of the copy is finished by moving the tracer disk about the illuminated field of the screen, the hand wheel is given one turn to bring a new enlarged image on the screen and to move the material block into a new position. The milling of the second plane of the copy is done in the same way as the milling was done of the first one. This work of milling the copy in planes is continued until the material block has made one complete revolution; which means that the work is continued until all pictures that were taken by the camera during one revolution of the camera around the object have been projected upon the screen and used.

The diameters of the tracer disks and milling cutters must be proportioned in accordance with the desired size of the copy. If the copy is expected natural size, the diameters of the cutters must have the same diameters as the tracer disks; if the copy is expected to be only one half the natural size, the diameters of the cutters must be only one half the diameters of the tracer disks, etc. These given figures are correct only when the film images are enlarged to the natural size of the object; if they are enlarged to a different size, the figures have to be determined accordingly. If small radii have to be worked out, tracer disks and milling cutters with correspondingly small diameters have to be used.

When finishing portions of the copy for which special form records were made, the milling apparatus has to be adjusted to give the working plane of the cutter the same relative position to the object that the plane through the cover edge had to the object during the form recording.

To obtain copies of various sizes, the distance between the working plane of the cutter and the axis of the revolving material block has to be changed; also a change in the adjustment of the pantograph lever arrangement has to be made. The larger the copy desired, the greater must be the distance between the working plane of the cutter and the axis of the material block; the smaller the copy, the shorter the distance. If the copy is expected to be natural size, and the film image is enlarged to full size, the pantograph lever arrangement must be adjusted to have the distance between the cutter spindle and the main fulcrum the same as the distance between the main fulcrum and the tracer disk-spindle; the distance between the working plane of the cutter and the axis of the material block must be the same as the distance between the edge of the cover and the center of the rotating ring of the form recording apparatus; and the tracer disks and the cutters used must have the same diameters. If the copy is expected to be one half the natural size, the distance between cutter spindle and main fulcrum must be only one half the distance between main fulcrum and tracer disk spindle; the distance between the working plane of the cutter and the axis of the material block must be only one half the distance between edge of cover and center of the rotating ring; the diameters of the cutters must have only one half the diameters of the tracer disks. For other sizes of copies the apparatus has to be changed accordingly. Instead of affecting a change in the size of the copy by changing the distance between the working plane of the cutter and the axis of the material block, and by changing the adjustment of the pantograph lever arrangement, different copy sizes can also be produced by changing the mentioned distance in connection with changing the size of the enlarged image.

After all planes are worked out, the surface of the copy shows very small steps, which steps result from working out the copy in planes. The height of these steps depends upon the number of planes in which the copy has been worked out. The greater the number of planes, the smaller the steps. The smoothing out of the steps and the removal of the teats used for supporting the material block during the milling operation completes the copy.

Method B.

Figure 3:
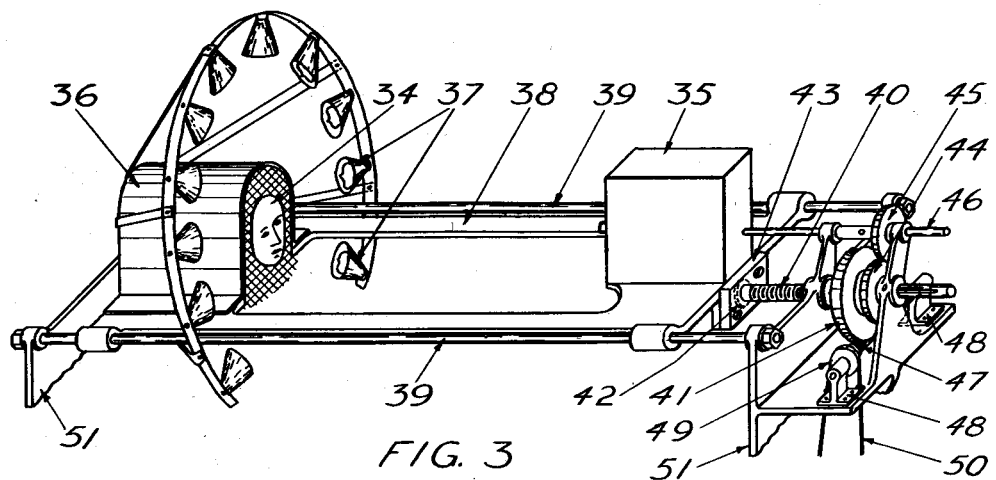
Figure 3 represents a perspective view of an apparatus for recording the form of the object according to method B.

Referring to Figure 3, which illustrates an apparatus for recording the form of the object in accordance with method B, numeral 34 represents the object of which the form is to be recorded; 35 is a moving picture camera directed towards the object; 36, a cover, open at the bottom and at one end, which openings allow the cover to be moved back and forth over the stationary object; and 37, sources of light placed outside the cover and around the object in a plane which is perpendicular in every direction to a line connecting camera and object, and which falls together with a plane laid through the edge of the cover. Numeral 38 represents a carriage holding camera and cover with lights; 39, two guide rods for guiding the carriage when moved back and forth by 40, a shaft. A portion of this shaft is threaded. This threaded portion coacts with the partially tapped hole of 41, a worm wheel, and is free to move in the hole of the inner vertical wall of 51, the apparatus stand. The right end of the shaft has its diameter reduced to the root diameter of the thread. This reduced portion is free to move in the hole of the outer, small vertical wall of the stand, and is provided with a longitudinal groove, into which extends the end of a guide screw, that is screwed into the outer, small vertical wall of the stand. This guide screw, coacting with the groove in the shaft, allows the shaft to make only longitudinal movements; it prevents the shaft from rotating. To the extreme left end of the shaft is rotatably fastened 42, a thrust disk, which is held in a recess of 43, a plate that is screwed to the carriage. This thrust disk, clamped by the plate against the carriage, forms one bearing for the shaft, while the hole of the outer, small vertical wall of the stand forms the other bearing. The length of the hub of the worm wheel equals the distance between the two mentioned walls of the stand; it has a working fit between them. It follows then, that the revolving worm wheel gives the shaft, which is prevented from rotating by the guide screw and groove, a longitudinal movement, which movement is transferred through the thrust disk to the carriage with lights and cover. Fastened to the worm wheel is 44, a gear, which engages in 45, a second gear, and which through 46, a camera shaft sets the inside mechanism of the camera in motion. The worm wheel is driven by 47, a worm, which is held in 48, two bearings, and which is connected through 49, a sprocket with 50, a chain, and another sprocket to a motor.

In method A the camera with cover and lights make rotating movements around the object, the pictures of the illuminated portions of the object are taken from different angles, and the various planes in which the contours of the object are made visible and photographed intersect each other; in method B the camera with cover and lights make back and forth movements in relation to the object, the pictures are all taken from the same direction, and the various planes in which the contours of the object are made visible and photographed are parallel to each other.

The motor in method B has two functions: to move through the chain and sprockets, the worm, worm wheel, and the threaded shaft the carriage with camera, cover, and lights back and forth, and to move through the mentioned parts and the two gears with the camera shaft the inside mechanism of the camera.

The object, which is placed under the cover to begin the form recording, is during the form recording gradually uncovered and exposed to the full light by the moving cover.

When the motor is running, the contrast line, which indicates the contour of the object at a plane through the cover edge, is constantly changing its position on the object, and the camera, which operates at the same time the cover and lights move, is automatically recording with each photographic exposure the contour line of the object as indicated at the moment of exposure by the contrast line. In this way the contour of the object is recorded in a series of planes which are all parallel to each other.

If, for instance, the object is a human head, and the camera is during the form recording in front of the object, directed towards the face as illustrated in Fig. 3, only a part of the object, in this case the face, has its form recorded with one series of pictures obtained during the movement of the camera in the direction of the object. For recording the other portions of the object, additional series of pictures of the object must be made by having the camera moved towards the stationary object from different directions. For this purpose the whole apparatus is supported by a turn table, which allows the apparatus to be pushed around the object and locked in various positions. The path that the camera describes in this position changing movement is circular with the object at the center of the described camera circle. The turn table may be constructed in many ways; the design is immaterial, as long as the table allows the apparatus to be rotated as indicated and arrested in various positions. The way the rotating is performed depends upon the design of the turn table. For recording the back portion of the head, the apparatus is turned 180 degrees, arrested in this position, and a new series of pictures made. Turning the apparatus around 90 degrees from its original position, arresting it, and making a new series of pictures, records the form of the object from the side. By taking additional series of pictures from different positions, the form of any desired portion of the object may be easily recorded.

It is immaterial whether the recording of the form begins with the object entirely kept in darkness, and the moving cover gradually uncovering it during the form recording; or whether it begins with the object entirely in full light, and the cover gradually covering it during the recording.

The accuracy of the form record or the number of pictures taken is controlled by changing the gearing of the apparatus.

Figure 4:
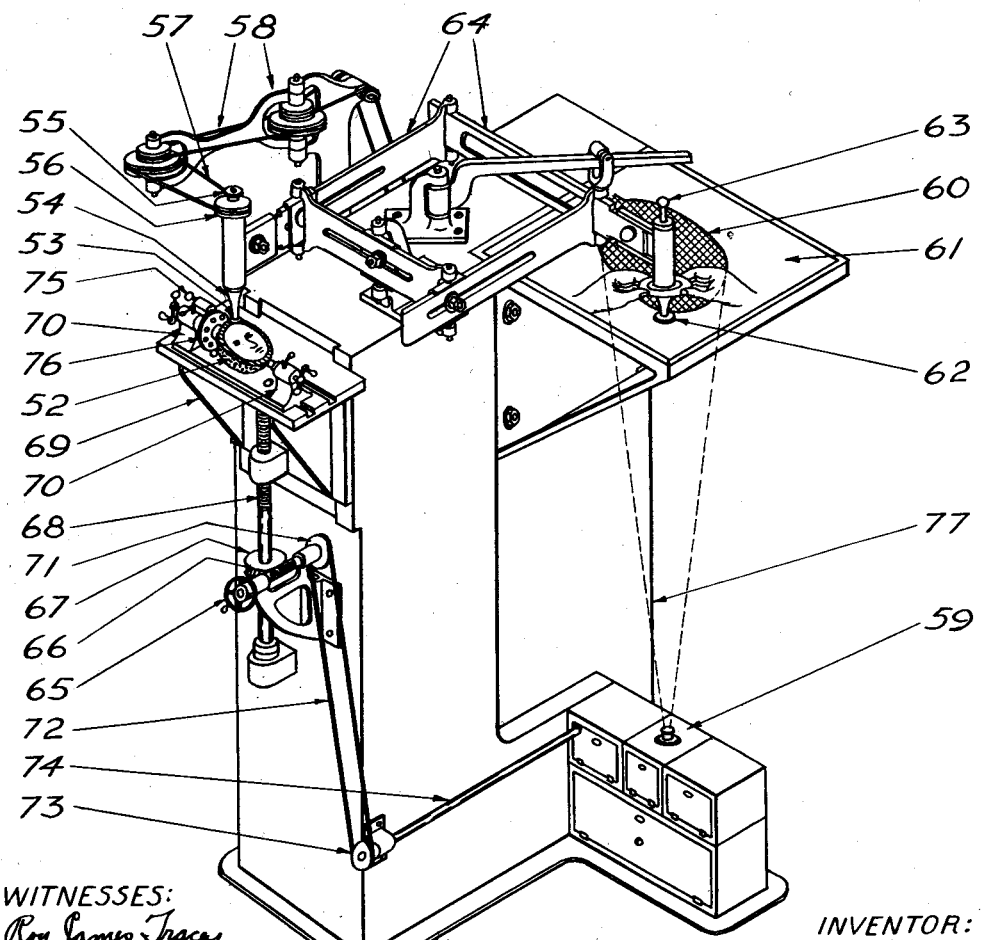
Figure 4 represents a perspective view of an apparatus for working out the copy from the material block according to method B.

Referring to Figure 4, which represents an apparatus for working out the copy from the material block in accordance with method B, numeral 52 represents the material block from which the copy is to be made; 53 is a shank milling cutter for milling away the excessive material from the material block; 54, a chuck for holding the various cutters used; and 55, a wheel for fastening the cutters in the chuck and cutter spindle. Numeral 56 represents a pulley which is connected through 57, a belt, and 58, a driving mechanism to a motor for driving the cutter spindle, chuck, and cutter. Numeral 59 represents an optical projector with light and means for holding and moving the film in the projector; 60, an enlarged film image; and 61, a ground glass or other suitable screen upon which the image is thrown by the projector. Numeral 62 represents a tracer disk; 63, means for fastening the various tracer disks in the tracer disk spindle; 64, a pantograph lever arrangement for transferring the movements given to the tracer disk to the cutter in either the same or different size. Numeral 65 represents a hand wheel, which through 66, a worm, 67, a worm wheel, and 68, a threaded spindle raises or lowers 69, a bracket. This bracket holds 70, a pair of centers between which the material block is rotatably supported. The hand wheel also drives the film holding and moving device of the projector through 71, a sprocket, 72, a chain, 73, another sprocket, and 74, a shaft. Numeral 75 represents an index pin, and 76, an index plate which together with the index pin holds the material block in various positions between the centers. Numeral 77 represents the stand of the apparatus.

The main difference between method A and method B of working out the copy from the material block is the relation existing between the planes in which the copy is worked out, and the way the material block is fed against the cutter for obtaining the depth of the cut. While in method A the planes intersect, and the material block receives a slight revolving movement for obtaining the depth of the cut, in method B the planes are all parallel to each other, and the material block is moved vertically against the cutter.

The same as in method A, the movements given to the tracer disk about the illuminated field of the screen are also in this method transferred by a pantograph lever arrangement to the rotating cutter, which removes the excessive material from the material block and leaves only a portion of the material block unremoved at the working plane of the cutter which has the same outline as the image and, consequently, the same contour as the object. The height of this unremoved portion equals the depth of the cut.

The feeding of the material block against the cutter for obtaining the cutting depth is affected by raising the bracket holding the material block. This raising is done through revolving the threaded spindle by turning the hand wheel which, fastened to the worm, rotates the worm wheel. The spindle is so connected to the film moving mechanism of the projector that for each new film image brought before the objective of the projector and enlarged upon the screen the revolving spindle raises the bracket with the material block an amount which is for a copy of the same size as the object the same as the distance the cover was moved between two photographic exposures during the form recording, and for a copy of one half the size of the object only one half of the distance the cover was moved between two photographic exposures. For other copy sizes the amount of the movement of the bracket is changed accordingly.

After one plane of the copy is worked out by moving the tracer disk about the illuminated field of the screen with the periphery of the tracer disk always touching the enlarged image outline, the hand wheel is turned one revolution to bring a new film image on the screen and to bring a new working plane of the material block in the reach of the cutter. The new plane is finished the same as was the previous one. This work of milling out a plane and turning the hand wheel is continued until all images comprising the form record have been used.

The same that was said in method A in regards to the diameters of the cutters in proportion to the diameters of the tracer disks, and in regards to the finishing of small radii applies also to this method.

During the milling out of a portion of the material block, the face for instance as illustrated in Fig. 4, the block is held stationary between the two dead centers 70 and prevented from rotating by the index pin 75 which is pushed into one of the holes of the index plate 76. For this purpose the material block is fastened to the index plate. For milling out the back portion of the head the index pin is pulled out of its index plate hole, the material block revolved 180 degrees, and the index pin pushed into the hole of the index plate which is located opposite the one the pin was in before. For each portion to be milled out the material block is so rotated and locked into position by index pin and index plate that it comes to the top. It is obvious that for each portion to be milled out the corresponding pictures must be successively projected onto the screen.

Different sizes of copies are obtained by a change in the distances between the fulcrums of the pantograph lever arrangement with a change in the distance the bracket with the material block is moved against the cutter, and by having the proper proportion between the diameters of cutters and tracer disks. A change in the size of the image on the screen combined with the proper proportion between cutters and tracer disks also gives different copy sizes. When, for instance, a copy of only one quarter the natural size is desired, the distance between the cutter spindle and the main fulcrum of the pantopragh lever arrangement must be only one quarter the distance between the main fulcrum and the tracer disk spindle; the material block must move against the cutter for each new working plane only one quarter the distance that the cover with light moved between two photographic exposures; and the cutters must have only one quarter the diameters of the tracer disks. This figure is based upon the assumption that the film image is enlarged to the natural size; if the image is enlarged to a different size, or if other copy sizes are desired, the figure has to be changed accordingly.

The final finishing of the copy consists in smoothing out the surface of the copy, and in removing the teats used for supporting the material block.

Method B of reproducing objects is also adapted for bas-relief work. By moving the material block for each new plane only a fraction of the amount that is required for making a normal copy, bas-reliefs are easily made.

This method may also be used for carving out molds. For this purpose the tracer disk is moved inside the enlarged film image on the screen, and the plane of the mold having the largest area must be carved out first.

Instead of having two different form recording apparatus and two different apparatus for milling out the copy for the two methods described, only one of each kind of apparatus is required, of which the form recording apparatus and the apparatus for milling out the copy must be constructed to allow the recording of the form of the object and the milling out of the copy be done according to either method.

When making a copy of a material which does not yield to milling, but requires a different material removing operation, the working tool of the apparatus for milling out the copy, the means of actuating the tool, the chuck, the spindle, etc., must be built accordingly.

Having thus described my invention, what I claim and desire to secure by Letters Patent is:

1. The art of making reproductions of three dimensional objects, including the steps of photographically reproducing a series of closed contour lines of the object, automatically connecting each photographed contour with the corresponding contour plane of the material block and making pantographically from the contour lines the desired reproduction.

2. The art of making reproductions of three dimensional objects, including the steps of photographically reproducing a series of segmental contours of the object, automatically connecting each photographed contour with the corresponding contour plane of the material block and making pantographically from such photographs the desired reproduction.

3. The art of making reproductions of three dimensional objects, including the steps of photographically reproducing of the object a series of contour lines of the object in planes parallel to the plane of the sensitive film, automatically connecting each photographed contour with the corresponding contour plane of the material block, and making pantographically from the photographs the desired reproduction.

4. The art of making reproductions of three dimensional objects, including the steps of photographically reproducing of the object a series of closed contour lines of the object in planes parallel to the plane of the sensitive film, automatically connecting each photographed contour with the corresponding contour plane of the material block, and making pantographically from the photographs the desired reproduction.

5. The art of making reproductions of three dimensional objects, including the steps of photographically reproducing a series of contour lines of the object obtained by planes intersecting the object at right angles to the optical axis of the camera, automatically connecting each photographed contour with the corresponding contour plane of the material block, and making pantographically from the photographs the desired reproduction.

6. The art of making reproductions of three dimensional objects, including the steps of photographically reproducing a series of closed contour lines of the object obtained by planes that are made by a dark space adjoining an illuminated one and that intersect the object at right angles to the optical axis of the camera, automatically connecting each photographed contour with the corresponding contour plane of the material block, and making pantographically from the photographs the desired reproduction.

7. The art of making bas-reliefs of three dimensional objects, which consists in illuminating segments of varying areas of the object; in taking a series of photographs of the varying segments; and in making pantographically from these photographs the desired bas-relief.

8. The art of making bas-reliefs of three dimensional objects, which consists in illuinating a segment of the object; in varying the size of the illuminated segment; in taking a series of photographs of the varying segments; and in moving a material removing tool in accordance with the outlines of said photographs, to secure in the material the desired bas-relief.

9. The art of making bas-reliefs of three-dimensional objects, which consists in illuminating a segment of the object; in varying the size of the illuminated segment; in taking a series of successive photographs of the varying segments; in projecting the photographs successively on a screen; and in making pantographically from the projected photographs the desired bas-relief.

10. The art of making bas-reliefs of three dimensional objects, which consists in illuminating a segment of the object; in varying the size of the illuminated segment; in taking a series of successive photographs of the varying segments; in projecting the photographs successively on a screen; and in moving a cutter in accordance with the outlines of said photographs to secure in the material the desired bas-relief.

11. The art of making bas-reliefs of three dimensional objects, which consists in illuminating a segment of the object; in varying the size of the illuminated segment; in taking a series of successive photographs of the varying segments; in projecting the photographs successively on a screen; in changing the position of the material block as different photographs are projected; and in moving a cutter in accordance with the outlines of said photographs to make from the material block the desired bas-relief.

12. The art of making bas-reliefs of three dimensional objects, which consists in moving an illuminated plane over the object, thereby gradually varying the size of the illuminated segment of the object; in taking a series of successive photographs of the varying segments; and in making pantographically from these photographs the desired bas-relief.

13. The art of making bas-reliefs of three dimensional objects, which consists in moving along a straight line, an illuminated plane over the object, thereby gradually varying the size of the illuminated segment of the object; in taking a series of successive photographs of the varying segments; in projecting the photographs successively on a screen; in changing the position of the material block as different photographs are projected; and in moving a cutter in accordance with the outlines of said photographs to make from the material block the bas-relief desired.

14. The art of making molds for three dimensional objects, which consists in illuminating a segment of the object; in varying the size of the illuminated segment; in taking a series of photographs of the varying segments; and in making pantographically from these photographs the desired mold.

15. The art of making molds for three dimensional objects, which consists in illuminating a segment of the object; in varying the size of the illuminated segment; in taking a series of photographs of the varying segments; and in moving a material removing tool in accordance with the outlines of said photographs to secure in the material block the desired mold.

16. The art of making molds for three dimensional objects, which consists in illuminating a segment of the object; in varying the size of the illuminated segment; in taking a series of photographs of the varying segments; and in moving a cutter in accordance with the outlines of said photographs, to secure in the material block the desired mold.

17. The art of making molds of three dimensional objects, which consists in illuminating a segment of the object; in varying the size of the illuminated segment; in taking a series of successive photographs of the varying segments; in projecting the photographs successively on a screen; and in making pantographically from the projected photographs the desired mold.

18. The art of making molds for three dimensional objects, which consists in illuminating a segment of the object; in varying the size of the illuminated segment; in taking a series of successive photographs of the varying segments; in projecting the photographs successively on a screen; and in moving a cutter in accordance with the outlines of said photographs, to secure in the material block the desired mold.

19. The art of making molds for three dimensional objects, which consists in illuminating a segment of the object; in varying the size of the illuminated segment; in taking a series of successive photographs of the varying segments; in projecting the photographs successively on a screen; in changing the position of the material block as different photographs are projected; and in moving a cutter in accordance with the outlines of said photographs to make in the material block the desired mold.

20. The art of making molds for three dimensional objects, which consists in moving along a straight line, an illuminated plane over the object, thereby gradually varying the size of the illuminated segment of the object; in taking a series of successive photographs of the varying segments; and in making pantographically from these photographs the desired mold.

21. The art of making molds for three dimensional objects, which consists in moving along a straight line, an illuminated plane over the object, thereby gradually varying the size of the illuminated segment of the object; in taking a series of successive photographs of the varying segments; in projecting the photographs successively on a screen; in changing the position of the material block as different photographs are projected; and in moving a cutter in accordance with the outlines of said photographs to make in the material block the desired mold.

22. The art of making reproductions of three dimensional objects, which consists in moving an illuminated plane over the object in a straight line and from different directions, thereby gradually varying the size of different, illuminated segments of the object; in taking from each direction a series of photographs of the varying segments belonging to this direction; and in making pantographically from the different series of photographs the desired reproduction.

23. The art of making reproductions of three dimensional objects, which consists in moving an illuminated plane over the object in a straight line and from different directions, thereby gradually varying the size of different illuminated segments of the object; in taking from each direction a series of photographs of the various segments belonging to this direction; and in moving a material removing tool in accordance with the outlines of said photographs to secure from the material block the desired reproduction.

24. The art of making reproductions of three dimensional objects, which consists in moving an illuminated plane over the object in a straight line and from different directions, thereby gradually varying the size of different illuminated segments of the object; in taking from each direction a series of photographs of the varying segments belonging to this direction; and in moving a cutter in accordance with the outlines of said photographs to secure in the material the desired reproduction.

25. The art of making reproductions of three dimensional objects, which consists in moving an illuminated plane over the object in a straight line and from different directions, thereby gradually varying the size of different, illuminated segments of the object; in taking from each direction a series of photographs of the varying segments belonging to this direction; in projecting the photographs of the different series successively on a screen; and in making pantographically from the projected photographs the desired reproduction.

26. The art of making reproductions of three dimensional objects, which consists in moving an illuminated plane over the object in a straight line and from different directions, thereby gradually varying the size of different illuminated segments of the object; in taking from each direction a series of photographs of the varying segments belonging to this direction; in projecting the photographs of the different segments successively on a screen; and in moving a cutter in accordance with the outlines of said photographs, to secure in the material block the desired reproduction.

27. The art of making reproductions of three dimensional objects, which consists in moving an illuminated plane over the object in a straight line and from different directions, thereby gradually varying the size of the different, illuminated segments of the object; in taking from each direction a series of photographs of the varying segments belonging to this direction; in projecting the photographs of the different series successively on a screen; in changing the position of the material block as different photographs are projected; and in moving a cutter in accordance with the outlines of said photographs, to make from the material block the desired reproduction.

28. The art of making reproductions of three dimensional objects, which consists in changing, along a straight line, and from different directions, the relative positions between the object and an illuminated plane, thereby gradually varying the size of the different, illuminated segments of the object; in taking from each direction a series of photographs of the varying segments belonging to this direction; and in making pantographically from the photographs the desired reproduction.

29. The art of making reproductions of three dimensional objects, which consists in changing, along a straight line, and from different directions, the relative positions between the object and an illuminated plane, thereby gradually varying the sizes of the different, illuminated segments of the object; in taking from each direction a series of photographs of the varying segments belonging to this direction; in projecting the photographs of the different series successively on a screen; in changing the position of the material block as different photographs are projected; and in moving a cutter in accordance with the outlines of said photographs to make from the material block the reproduction desired.

30. In a carving machine for reproducing a three dimensional object from a series of photographed contour lines of the object, the combination of a device for holding and moving the material block; a device for holding and moving the film having the series of photographed contour lines; and means for connecting both devices so that by actuating the connecting means the holding and moving device for the material block will move the material block, and the holding and moving device for the film will move the film to bring the various photographed contours in co-relation to the corresponding contour planes of the material block.

In testimony whereof, I have signed my name to this specification in the presence of two witnesses.

WILLIAM FRED ENGELMANN.

Witnesses:
ROY JAMES TRACEY,
CLAUDE NATHAN MANGAN.